(12) United States Patent
Morgan et al.

(10) Patent No.: US 7,107,522 B1
(45) Date of Patent: Sep. 12, 2006

(54) SYSTEM AND METHOD FOR CREATING EXTENSIBLE CONTENT

(75) Inventors: Kelly C. Morgan, Marietta, GA (US); Ronald J. Perella, Atlanta, GA (US); Kevin G. Cartwright, Atlanta, GA (US); Karl B. Cartwright, Lawrenceville, GA (US); Steven N. Tischer, Atlanta, GA (US); Suzanne M. Denevan, Atlanta, GA (US); Robert J. Godsey, Tucker, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 572 days.

(21) Appl. No.: 10/024,142

(22) Filed: Dec. 21, 2001

(51) Int. Cl.
*G06F 15/00* (2006.01)

(52) U.S. Cl. ............ 715/513; 715/523; 715/792

(58) Field of Classification Search ........... 715/513, 715/517, 511, 500; 707/513, 506; 709/217, 709/200; 345/727, 854; 358/1.15
See application file for complete search history.

(56) References Cited

U.S. PATENT DOCUMENTS

| | | | |
|---|---|---|---|
| 5,991,770 A | 11/1999 | Zamora-McKelvy | |
| 6,353,483 B1* | 3/2002 | Laverty et al. | 358/1.15 |
| 6,424,979 B1* | 7/2002 | Livingston et al. | 715/511 |
| 6,583,800 B1* | 6/2003 | Ridgley et al. | 345/854 |
| 6,643,640 B1 | 11/2003 | Getchius | |
| 6,650,433 B1* | 11/2003 | Keane et al. | 358/1.15 |
| 6,876,973 B1 | 4/2005 | Visconti | |
| 6,912,691 B1 | 6/2005 | Dodill et al. | |
| 2001/0032193 A1 | 10/2001 | Ferber | |
| 2002/0003547 A1* | 1/2002 | Wang et al. | 345/727 |
| 2002/0049788 A1* | 4/2002 | Lipkin et al. | 707/513 |
| 2002/0078168 A1* | 6/2002 | Christfort et al. | 709/217 |
| 2002/0194219 A1* | 12/2002 | Bradley et al. | 707/506 |
| 2003/0018694 A1* | 1/2003 | Chen et al. | 709/200 |
| 2003/0074636 A1* | 4/2003 | Manepalli | 715/513 |
| 2003/0140308 A1* | 7/2003 | Murthy et al. | 715/500 |

OTHER PUBLICATIONS

U.S. Appl. No. 60/328,819.*
U.S. Appl. No. 60/326,052.*
Yu et al. Sematic Adatation of Schema Mappings when Schema Evole Published by VLDB Norway 2005 pp. 1006-1017.*
U.S. Appl. No. 10/026,705, filed Dec. 27, 2001, Morgan.

* cited by examiner

*Primary Examiner*—William Bashore
*Assistant Examiner*—Quoc A. Tran
(74) *Attorney, Agent, or Firm*—Withers & Keys, LLC

(57) ABSTRACT

A system and method for generating validated extensible content using (i) a ubiquitous portable application as a lightweight data form entry tool, (ii) a business-specific DTD, and (iii) a transformation extensible stylesheet language construct (XSL). In an exemplary use, the system and method is employed to create advertisements for, e.g., a directory. Basic copy information is received in a first database accessible to advertisement salespeople. A second database that is accessible to a graphics artist periodically receives the basic copy information from the first database. The second database is in communication with a graphics workstation, wherein the workstation is operable to (i) access the second database, (ii) launch a first software program, the first software program presenting a form that is displayed on the workstation, wherein the first software program has a native file saving format that is different from a format of an XML file, (iii) at least one of modify selected fields in the form and add data to fields other than the selected fields, (iii) spawn a graphics page using the first software program to display a graphic consistent with the information in form, and (iv) save the information in the form as an XML file.

31 Claims, 7 Drawing Sheets

Bar & Grille

Chase Pub & Grille
2015 Valleydale Rd. Pelham
733-0528

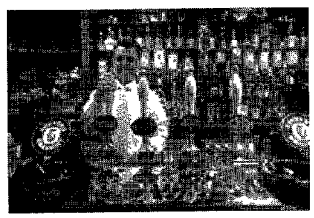

Have you ever heard your friends say "Meet me at Chase!" Where old friends meet and new friends are welcome. Great Food!
Served 3pm until midnight & beyond. Karoke & live entertainment. Full bar and frozen drinks. Pool tables, dart boards, 9 large T.V's.
Open Mon - Fri 3pm til. Sat 5pm til.
Open for fall football.
ATM inside
Located at Valleydale Rd. at Hwy 31   ~102a $ 

Barbeque

Bob Sykes Barbecue Inc
1724 9th Av, Bessemer
428-5706

Voted Bama's best barbecue! Succulent pork, chicken, ribs and beef. We have homemade desserts and side items. Catering and take out available. Learn more about traditional southern barbecue on the internet www.bobsykes.com ~203a $ 

Carlile's Barbeque
3511 6th Ave So
254-9266

Serving B'ham BBQ since 1947. Traditional vinegar based sauce in addition to tasty rib sauce. Fresh cut French Fries. Mon.-Sat. Closed Sunday.

~203b $ 

Costa's Famous Bar-B-Que
Old Springville Rd.   853-9933
Finley Blvd.   252-2109

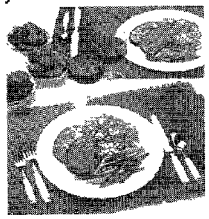

A Birmingham fixture for years, Costa's feeds you more than you need, piles enough meat on the platter to make it scream, smothers it with their famous sauce, and still you leave with change in your pocket! So come on in and enjoy southern hospitality and famous barbecue... we have pork, beef, chicken, ribs, burgers and steaks. Dine in, Carry-Out, or Drive-Thru. We're open seven days a week and cater banquets, parties and picnics. TWO LOCATIONS TO SERVE YOU:
Huffman - Fax 856-0267   Finley Blvd. - Fax 252-4660

$    ~201b

Dreamland Bar-B-Que
1427 14th Ave So.
(205) 933-2133

Bar-B-Que ribs our specialty - pork sandwiches, chicken & sides.
Just 6 blocks South of UAB.
"Ain't Nothin' Like 'Em Nowhere!" See our display ad in this section.

~203

$ 

Figure 2

Ad.Creation.Station V.01

User ID: 
Copy ID:

Edit

Figure 4

Ad.Creation.Station V.01                                    clear

AD ID  987544321            Email Address
Firm Name  fakeBusinessName    Website URL
Address  1234 fake address  99999    Year Established
Phone Number  123  456  7890    Main Selling Point Pub Dir  432            Restaurant Heading  Fine Dining
Directory            HC  987
Customer ID  9876        Cuisine  Cajun
Sales Person  987544321        UDAC Cost:                    American Express    ATM/Debit Cards Accepted    D  Delivery
S$$ $51 or above    Diners Club    NC  No Credit Cards Accepted    T  Delivery
S$$ $31-$50    Discover        Parking/Valet Available    P  Delivery
$$ $16-$30    Visa        Wheelchair Access    Y  Delivery
$$ $15 or below    Mastercard        Coupon Available    ¶  Delivery
                    Reservations Accepted        Delivery
                DR  Dress Restrictions            Delivery Map Region            Map Locations
Map Region
Map Region
Map Region Edit Ad    Save Ad

Figure 7

| Cuisine<br>UDAC | |
|---|---|
| ATM/Debit Cards Accepted<br>No Credit Cards Accepted<br>Parking/Valet Available<br>Wheelchair Access<br>Coupon Available<br>Reservations Accepted | African<br>American<br>Argentenian<br>Bakery Deli<br>Barbecue<br>Bars Grill<br>Brazilian<br>Cajun<br>Caribbean<br>Catfish |

Figure 8

| UDAC | |
|---|---|
| ATM/Debit Cards Accepted<br>No Credit Cards Accepted<br>Parking/Valet Available<br>Wheelchair Access<br>Coupon Available<br>Reservations Accepted<br>Dress Restrictions | DGAN - Anchor Listing<br>DGCUPN - Coupon<br>DGDL<br>DGFP<br>DGHP<br>DGIBC<br>DGIFC<br>DGOBC<br>DGQP<br>DGRL |

SYSTEM AND METHOD FOR CREATING EXTENSIBLE CONTENT

A portion of the disclosure of this patent document contains material which is subject to copyright protection. The copyright owner has no objection to the facsimile reproduction of any one of the patent document or the patent disclosure, as it appears in the Patent and Trademark Office patent file or records, but otherwise reserves all copyright rights whatsoever.

BACKGROUND

1. Field of the Invention

The present invention is directed to data management. More particularly, the present invention is directed to systems and methods for gathering data and, using an arbitrary structure such as a document type definition (DTD), generating and emitting world wide web consortium (W3C) compliant extensible markup language (XML).

While the present invention is directed generally to generating or creating any content, the following patent description focuses on collecting data (content) for creating a graphics package in the form of a dining guide directory. However, those skilled in the art will appreciate that this particular instance or use of the invention is to be considered non-exhaustive and exemplary in nature only.

2. Background of the Invention

The field of graphics has enjoyed substantial growth over the past few years. As high performance computers and printers have become more readily available and inexpensive, software application writers have developed several graphics applications that have significant capabilities. For example, PhotoShop and Illustrator both from Adobe (San Jose, Calif.) provide, respectively, advanced image editing capabilities and vector graphics software. These software packages allow graphics designers to complete a graphics design from beginning to end on a single personal computer and output, for example, a portable data format (PDF) file, which can be displayed on another personal computer or can be printed.

Typically, programs such as PhotoShop and Illustrator operate using proprietary file formats that may not lend themselves to being easily manipulated for other programs to use or for any other purpose that a user might desire. In the case of yet another Adobe software package, namely Acrobat, a file format known as XFDF is employed. While this file format is known to those skilled in the art and useful for the purpose for which it was designed, the format is not universally employable. That is, the format works well with software programs written by Adobe, but may not be convenient to be used for other business-specific purposes.

Another problem existing in prior art graphics systems is the lack of data validation, meaning, for example, that required content parts related to a pre-defined structure are present. While there are tools for data entry validation against standardized structures (e.g., Documentum (Pleasonton, Calif.)), they are typically full-blown, large, stand-alone applications in their own right.

SUMMARY OF THE INVENTION

The present invention provides a ubiquitous, inexpensive way to utilize particular business structure files (e.g., document type definitions (DTDs), SML Schema, or other similar files) to allow data entry on multiple devices and platforms without rewriting the entry tool each time business content structures are changed. The present invention also provides control over the interface for data entry with a standardized construct.

More particularly, the present invention utilizes an existing, ubiquitous, portable application (e.g., Adobe Acrobat) as a lightweight (small software footprint) data form entry tool. Combined with business-content structure files (DTDs) and procedural code written to operate in conjunction with a standardized application (e.g., Adobe Acrobat) using standardized transformation extensible stylesheet language construct (XSL), the present invention provides a complete, ultra-lightweight, extensible/repurposable tool for validated content entry and creation of content in an extensible markup language (XML) format.

Although the present invention has wide ranging applicability, it may be, for example, implemented in the specific context of publishing dining guides that may be distributed along with or in telephone books (i.e., the Yellow pages) in a particular locality. In this example, advertisement salespeople sell advertisement space in the dining guide and enter basic information such as restaurant name, address, and advertisement type in a database. This information is then populated in a form that is displayed to a graphics artist. The graphics artist modifies and/or adds to the form as necessary. Then, the graphics artist is given an opportunity to edit the advertisement itself, which includes at least some of the information that was displayed by the form.

The graphics artist may also edit photographs and logos that may be included as part of the advertisement. Ultimately, the graphics artist saves the advertisement. In accordance with the present invention, the advertisement is saved not only in the native format of the graphics application being used (e.g., Adobe Acrobat's XFDF format), but the native format is also preferably transformed into and saved as world wide web consortium (W3C) compliant and valid XML using XSLT (extensible stylesheet language). As a result, the data/information underlying the advertisement can be subsequently retrieved and/or repurposed.

It is therefore an object of the present invention to provide a system and method that is designed to generate content by employing a ubiquitous and lightweight software package as a data entry tool and saving resulting data files in an XML format.

It also an object of the present invention to provide a system and a method of employing XML to easily repurpose information that might originally be collected with a different purpose in mind.

It is also an object of the present invention to facilitate the overall generation of content directed to a graphics design, directory, etc. through the use of graphics generation software packages, databases and XML.

It is still another object of the present invention to provide an extensible stylesheet language construct to transform a native application file format into a business-specific XML format.

These and other objects of the present invention will become apparent upon a reading of the following detailed description of the invention in conjunction with the accompanying drawings.

BRIEF DESCRIPTION OF THE DRAWINGS

FIG. 2 is an exemplary page of a dining guide including different advertisement styles.

FIGS. 4–10 illustrate exemplary data input and graphics screens in accordance with the present invention.

DETAILED DESCRIPTION OF THE INVENTION

The purpose of the present invention is to facilitate, using standardized tools and systems, the generation of extensible content, one instance of which could be a multi-page book, insert, or other directory that comprises several types of entries. While much of the following describes an instance of a graphics product, those skilled in the art will appreciate that the scope of the present invention is intended to cover, generally, any extensible content.

Figure 1:
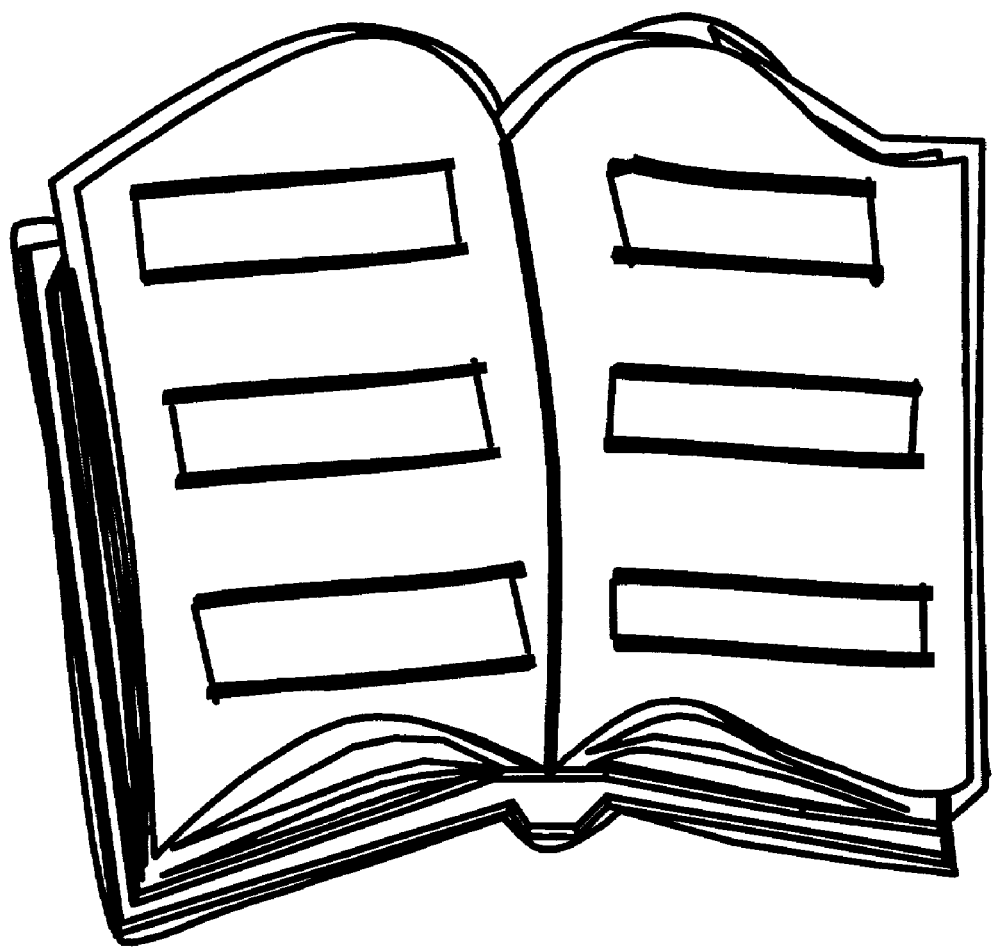
FIG. 1 shows a dining guide that is a compilation of advertisements generated and stored in accordance with the present invention.

FIG. 1 shows one such exemplary directory product, a dining guide, that might be distributed at the same time that a telephone book such as the Yellow Pages is distributed in a particular locality, or may be included in the Yellow Pages.

FIG. 2 shows an exemplary page of the dining guide of FIG. 1, including several advertisement styles. For example, advertisements 201a and 201b include a photo or logo and are larger than advertisements 203a, 203b and 203c, which do not have a photo or logo. In addition, the amount of text associated with different advertisements varies as does the actual size of the ad. Each of the advertisements shown on the exemplary page of FIG. 2 is generated by the method and system of the present invention.

Figure 3:
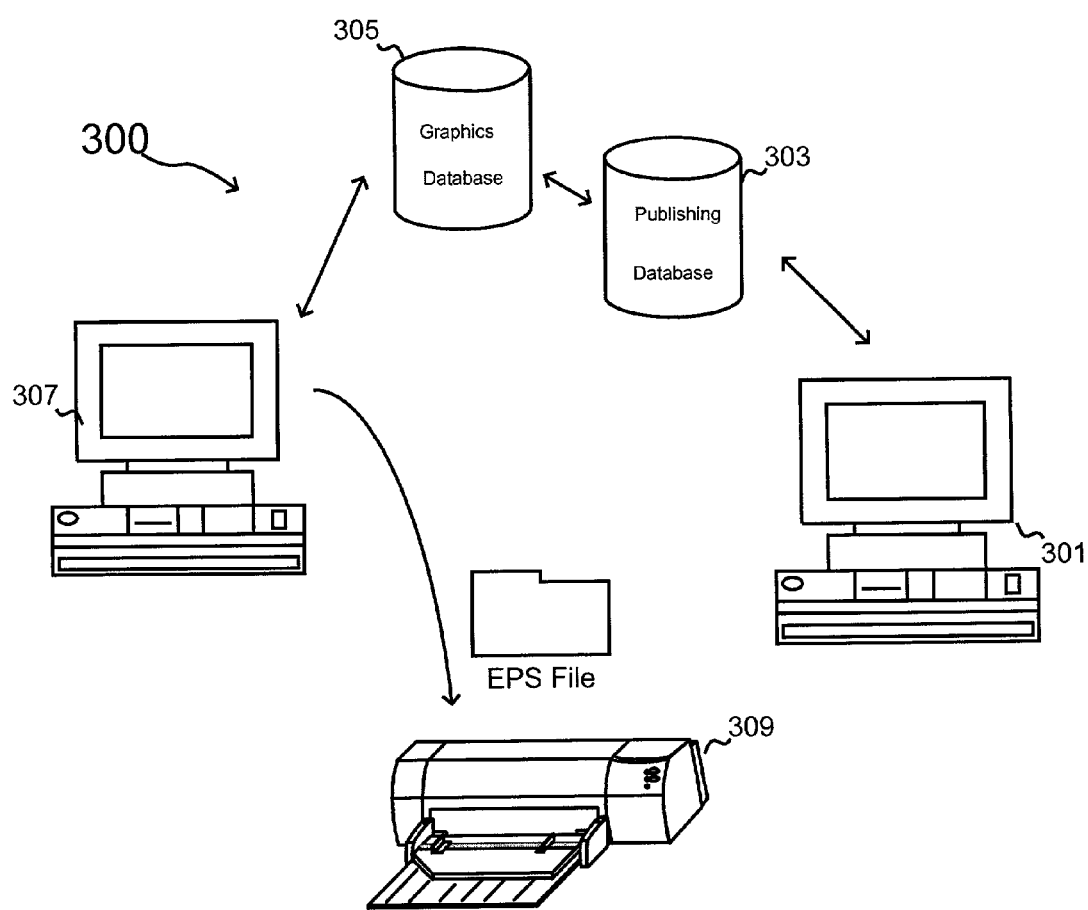
FIG. 3 illustrates exemplary components for practicing the present invention.

FIG. 3 illustrates several exemplary components for implementing the present invention in the context of a dining guide. Account sales personnel sell advertising space to, in this case, restaurants located within a specific geographical region. The responsible account sales person (or another employee of the company) then enters basic data about the restaurant into publishing database 303 via workstation 301. Included with the entered data are preferably both an advertisement ID (Ad ID) and copy ID, explanations of which will be provided below. Then, periodically, the information stored in publishing database 303 is transferred to graphics database 305, which can be accessed by workstation 307, which is operated by a graphics artist. Ultimately, workstation 307 outputs an encapsulated PostScript (EPS) file which, for example, is forwarded to a printer 309 for printing and distribution along with, for example, the Yellow pages. Separate databases 303 and 305 are preferably employed to keep the activities of salespeople and graphics artists logically separated. However, these two databases could also be combined into a single database if such an implementation were desired. In this implementation of the present invention, data in publishing database 303 flows through a daily batch process into graphics database 305. At the same time, a new PO (purchase order) corresponding to the newly-sold advertisement is passed to the graphics artist, which alerts the graphics artists that a new advertisement needs to be worked on.

FIGS. 4–10 illustrate exemplary data input and graphics screens in accordance with the present invention. Preferably, Adobe Acrobat (e.g., version 5.0), or a software application that has similar functionality, is used to create the forms and elements of the screens shown in FIGS. 4–10. Referring first to FIG. 4, a graphics artist working at work station 307 would first be presented with a log-on screen via which he or she would enter a user ID and a copy ID. The copy ID identifies a particular advertisement to be worked on and corresponds to a copy ID entered by a salesperson (or other employee) into workstation 301 and stored in publishing database 303.

Assuming there is a match between a copy ID (and thus a corresponding file) in graphics database 305 and the copy ID entered in the log-on screen of FIG. 4, then a screen such as, for example, the screen of FIG. 5 is preferably displayed to the graphics artist. Using the data from the corresponding file, the form of FIG. 5 is populated with the information collected and stored by the salesperson. The form of FIG. 5 also displays an advertisement or Ad ID. While the copy ID is an identifier of a particular advertisement that may be used in, for example, several different dining guides, the Ad ID identifies a particular advertisement for a particular dining guide. In other words, each Ad ID might be associated with several different copy IDs.

Referring still to FIG. 5, information such as the restaurant name, its address and telephone number, as well as an e-mail address, website URL, the year the restaurant was established and a main selling point (e.g. "centrally located," or "reasonable prices") are displayed.

In the middle section of the screen of FIG. 5 additional information about the particular ad is displayed including the directory in which the ad will be published, a customer ID and the salesperson responsible for selling the ad.

In addition, on the right hand side of the middle portion of the screen of FIG. 5 the graphics artist is given the opportunity to choose, via a pull-down menu, a restaurant heading. An exemplary pull-down menu for restaurant headings is shown in FIG. 6. Also, the graphics artist is requested to include information related to heading code (HC), which is a number associated with a specific Yellow page directory heading category. The graphics artist can also choose the type of cuisine through a pull-down menu such as that shown in FIG. 7. Still further, the graphics artist can choose, via a pull-down menu like that shown in FIG. 8, a universal directory advertising code (UDAC) which specifically identifies a particular advertisement style. The following table provides several examples of the types of advertisement styles that can be made available to the graphics artist via the system and method of the present invention.

| UDAC | Description | Ad Dimension | Specifications |
| --- | --- | --- | --- |
| DGCUPN | Coupon | 288 × 153 | Standard display ad content specifications |
| DGRL | Small Regular Listing Display Ad Test Only. | 580 × 61 | Up to 3 lines of text @ 100 Characters Per Line (CPL). Text Only. The main number is located on the left and additional telephone numbers can be included in text. |
| DGDL | Double Regular Listing Display Ad. Picture or Logo (Left) and Test (Right) 2 additional addresses may be substituted for picture/logo. | 580 × 122 Picture Dimensions 126 × 80 | Picture in designated area (left) and up to 7 lines of text @ 100 CPL. The main number is located on the left and additional telephone numbers can be included in text. |

-continued

| UDAC | Description | Ad Dimension | Specifications |
|---|---|---|---|
| DGTL | Triple Regular Listing Display AD. Large Picture or Picture and Logo on left. Logo's and Text on right Or Text only on right | 580 × 183 Picture Dimensions 126 × 136 | Larger picture, Logo or Picture and Logo in designated area and up to 12 lines of text @ 100 CPL and or a combination of text and logo's in text area. Logos must be placed at the top. No more than 3 Logos permitted. Logos must have like treatment and may not be larger than 67 × 67 pts The Spec Book must be reviewed to ensure that all rules are adhered to when advertising more than one restaurant. The main number is located on the left and additional telephone numbers can be included in text. |
| DGQP | Quarter Page Display Ad | 288 × 306 | Standard ad content specs |
| DGHP | Half Page Display Ad | 580 × 308 | Standard ad content specs |
| DGFP | Full Page Display Ad | 580 × 620 | Standard ad content specs |
| DGANC | Anchor Listing for Display Ads | 580 × 30 | The Anchor is the free listing that will accompany every sold Display ad (DGQP and larger). This listing will read "For more information please see our ad in this section" |
| DGIBC | Full Page Inside Back Cover Ad | 580 × 720 | Sold as Full Page only. Standard ad content specs |
| DGIFC | Full Page Inside Front Cover Ad | 580 × 720 | Sold as Full Page only. Standard ad content specs |
| DGOBC | Full Page Outside Back Cover Ad | 580 × 720 | Sold as Full Page only. Standard ad content specs |

Figure 9A:
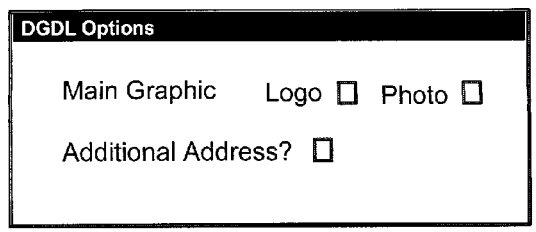
Figure 9B:
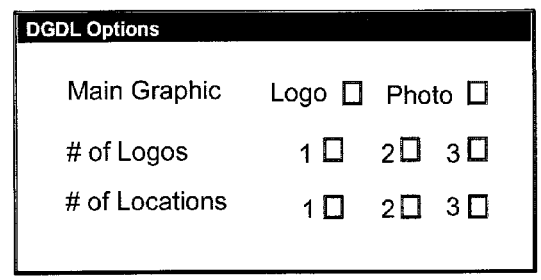

Once the basic information related to a particular advertisement is populated in the upper and middle sections of the form as shown in the screen shot of FIG. 5, the graphics artist then chooses, in the bottom portion of the form, one or more of several "amenities." Such amenities might include whether particular credit cards are accepted, whether smoking is permitted, or whether delivery is available. Other available options can be readily gleaned from the form of FIG. 5. FIGS. 9*a* and 9*b* show, respectively, additional options that would be displayed to the graphics artist in the lower left hand portion of FIG. 5 if the UDAC selected was a DGDL or DGTL, which are respectively a dining guide double listing and dining guide triple listing. In the case of the former, a logo or photo can be included with the advertisement. In the case of the latter, three logos or photos can be selected. As will be readily understood by those skilled in the art, the screens and options presented to the graphics artist will depend substantially on the UDAC that has been selected. In this way, the graphics artist will be prompted only for the information that is necessary to fill out and complete a particular advertisement style, thereby streamlining the overall task.

Figure 10:
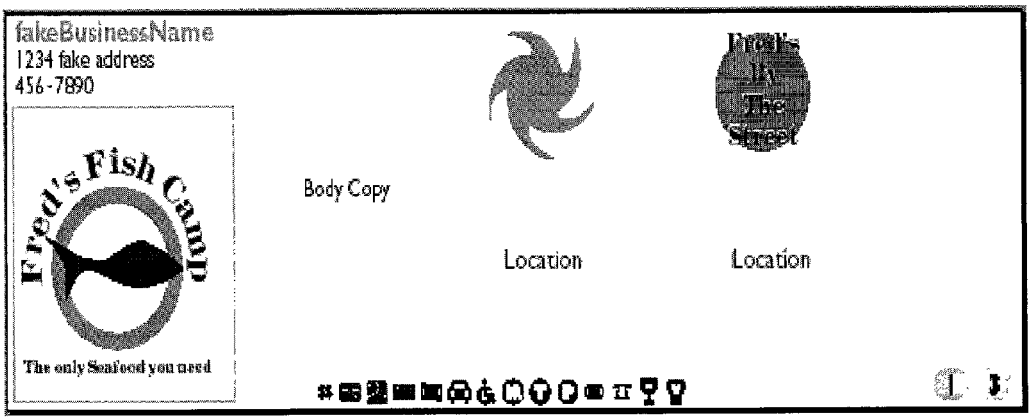

Referring again to FIG. 5, the lower left-hand corner of the bottom portion of the form includes an area that, after being used for, e.g., the forms of FIG. 9*a* or 9*b* (if necessary), preferably displays the advertisement in the format corresponding to the selected UDAC. In a preferred embodiment, the system of the present invention permits the graphics artist to click on the edit ad button located immediately below that area, thereby spawning a new graphics page within Adobe Acrobat (assuming that is the software application being used) that shows a more comprehensive view of the advertisement. FIG. 10 shows an exemplary screen shot of the newly-spawned page. PhotoShop or Illustrator can be used to create or edit photos or logos that are to be included in the advertisement. Once the session with PhotoShop or Illustrator is complete and the specific graphic (photo or logo) is saved, the application controlling the process according to the present invention reverts the user back to the spawned page shown in FIG. 10. The artist completes the ad by entering the body copy and returns to the form of FIG. 5 and then saves the ad in accordance with the principles of the present invention, which will be described in detail below.

Figure 11:
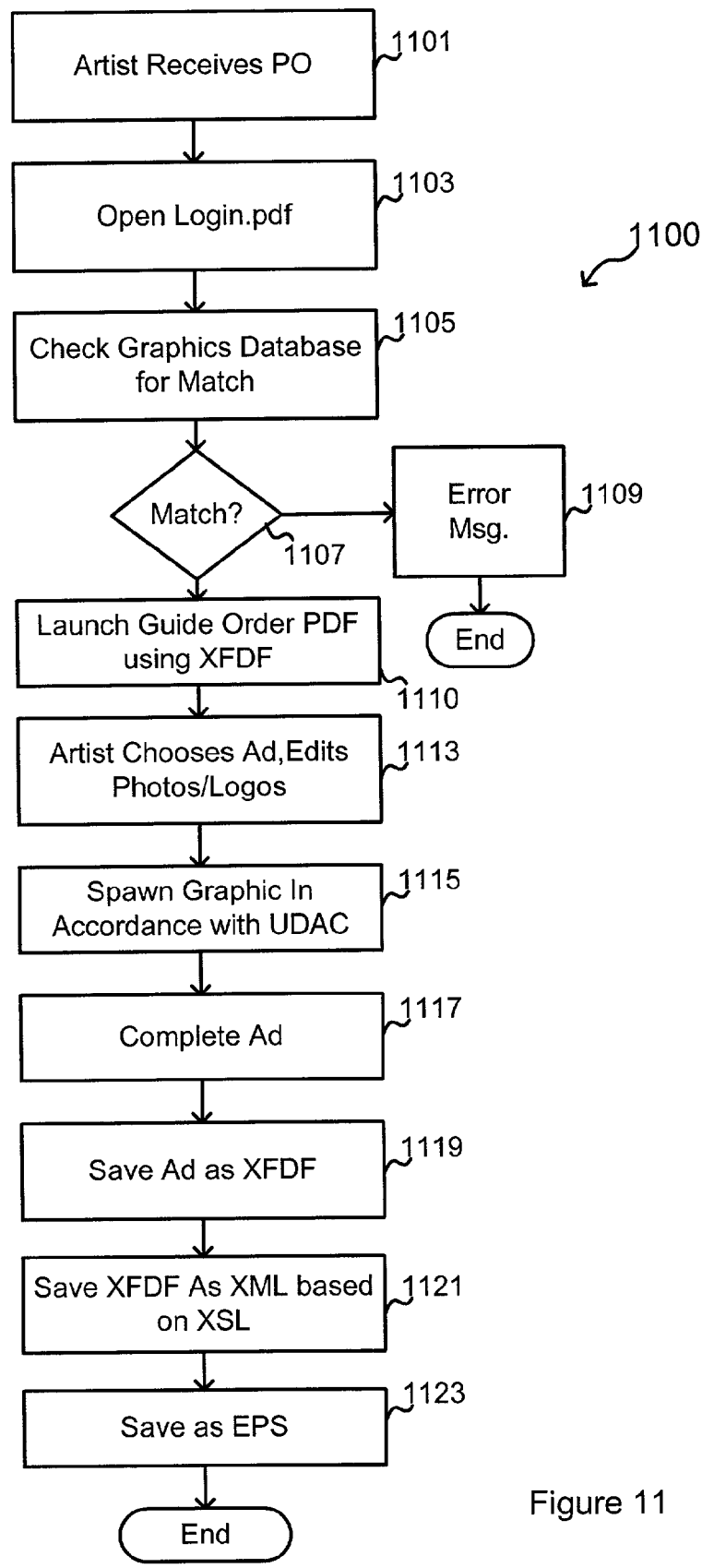
FIG. 11 illustrates an exemplary series of steps for practicing the present invention.

FIG. 11 depicts an exemplary series of steps 1100 for practicing the present invention. In an exemplary scenario, an artist receives a printed PO or purchase order (step 1101) that has been generated by a salesperson who sells advertisement space and, in this particular case, advertisement space in a dining guide. As described earlier, at least some of the information on the PO is keyed into a computer system by the salesperson himself, or by another employee. Such information will typically include firm (restaurant) name, telephone number, and address, etc, making that information automatically available later to the electronic form in accordance with the present invention. This allows the later automatic population of this information into the electronic form without re-keying.

Having received the PO, the artist launches a software program by opening a file such as "login.pdf"(step 1103), which is a PDF formatted file that causes Adobe Acrobat to be automatically launched. Login.pdf is a form that preferably includes fields for entering an artist's user ID and a copy ID (FIG. 4), which presumably is available from the PO. The copy ID is a numeric number tagged to a particular file and is preferably linked to a particular customer. Preferably, each customer has its own unique number.

At step 1105, the process according to the present invention checks graphics database 305, for example, to match the entered copy ID with an existing file, and preferably an existing XML file, as will be explained in more detail below. If a match is found (step 1107), then at step 1111, a form like that shown in FIG. 5 is launched and populated with data for the ad corresponding to the copy ID. If no match is found, then an error message is preferably generated and displayed at step 1109 and the process ends.

Assuming the form of FIG. 5 is an Adobe Acrobat form, the data would be formatted according to Adobe's native XFDF file format, which is employed by Acrobat and is used to reload information back into a previously-created PDF form. In accordance with the present invention, the information that is reloaded, namely, the information entered by a salesperson (or employee) or the graphics artist himself, is stored not only in an XFDF format, but also preferably in an XML format, thereby exploiting the advantages of world wide web consortium (W3C) compliant and valid XML.

More specifically, data for each advertisement is saved not only in an XFDF format, but also as XML, in accordance with, for example, a document type definition (DTD) such as the DTD set forth in Appendix A, which is designed, in this case, with a particular dining guide structure in mind. As a result, it is significantly easier, for example, to modify and/or repurpose the information after it has been stored. In the case where existing content that has been previously created in accordance with the process of the present invention needs to be edited, the XFDF format file is opened by the Acrobat application and directly populates the form. After corrections are made the process of saving XML is repeated whereby the originally-saved XML file is replaced with another one of the same name, which includes the revisions. Also, another revised XFDF file is created to replace the previous version. An exemplary XSLT file is appended hereto as Appendix B, and those skilled in the art will readily appreciate how to apply such an XSLT file to data stored in an XFDF format, for example.

At step 1113, the artist fills out or edits any fields in the form of FIG. 5 that are missing or need correcting. The artist also chooses ad size, amenity icon locations and, depending on the ad size and available options, chooses the numbers of logos and/or photos, and then clicks the edit button. In other words, the graphics artist clicks on all the desired boxes in the lower third of FIG. 5 and chooses from the several available options depending on the particular UDAC (advertisement style). Each of the icons is preferably preset as part of an overall data structure that defines the overall dining guide, namely the DTD, or document type definition. In the case of a basic advertisement, for example, the XML file comprises elements such as "payment options," wherein a subset of payment options might include the possibility "accept credit cards," and wherein a subset of "accept credit cards" might include "American Express," "Diner's Club" or "no credit cards accepted." These elements are easily recognizable in the DTD of Appendix A.

The XML representation and storage of the data upon which a particular advertisement is based is a significant aspect of the invention. The resulting XML file, which includes separate structured elements, is not directly related to printing or any other predetermined use. Accordingly, the XML file can be easily repurposed, as desired. One example of repurposing might include using a portion of the text of an advertisement (e.g., a slogan or main selling point) as the content for a voice portal, whereby when a person dials into the voice portal to find or learn about a restaurant, the person would hear the selected text synthesized and spoken to them, via a text-to-voice system. Another repurposing example is to use the selected text as part of a text message advertisement that is sent, on demand, to a wireless pocket pager.

Referring again to FIG. 11, at step 1115, upon clicking the edit button in FIG. 5, a new page is spawned on workstation 307 showing the actual advertisement layout with the correct advertisement size along with populated data, correctly colored, etc. This spawned page preferably uses Adobe Acrobat (or a similar graphics program) and the graphics artist then proceeds to complete the ad (step 1117) by making any necessary color changes or modifications to logos or photos, for example.

The new page that is spawned is based on the selected template or UDAC. If a logo or photo is called for in the layout, then a graphics box is preferably allocated at a predetermined location. The artist clicks on this location to launch, for example, Adobe Illustrator or PhotoShop for editing that graphics box. In the XML that is ultimately saved, the logo or photo is saved as a file name or link to a file.

There are significant advantages to relying on XML instead of a native format of a particular software application, such as Adobe's XFDF format. For example, a standard option of XML is validation. Valid XML means that the XML file must be consistent with the structure of the corresponding DTD. Thus, if a firm (a restaurant in the example described above) name is required in the corresponding DTD, the corresponding XML file will not be valid unless a firm name has been entered. In addition, with XML it is possible, for example, to delineate how many characters are permitted within a selected section of an advertisement, e.g. 100 characters, 500 characters, etc. Accordingly, the structural capabilities of XML are greater than the typical formats of native graphics applications, including Adobe Acrobat.

To exploit the advantages of XML, the present invention uses a structure having several hierarchical nested structures that describe the various combinations available, including each UDAC, sub-UDACs and combinations of UDACs. As can be readily appreciated, using Adobe Acrobat as a data entry tool enables the use of a business specific structure without having to require a user to have a business specific application.

When the artist has finished with Illustrator or PhotoShop, the screen displayed to the artist will revert back to that shown in FIG. 5. The artist will then have the opportunity to save the advertisement by clicking the save button, step 1119. Then, at step 1121 the information related to the entire advertisement that is being saved is saved in the native application format (Adobe XFDF in this case), XML for later retrieval by employing transformation using a pre-designated XSLT file, and preferably also encapsulated PostScript (EPS) (step 1123), which is preferably used by printing devices.

While the directory generating implementation of the present invention has been described in the context of workstation 307 being connected to a database, workstation 307 could be operated independently, that is, not connected to a network. In such a case, an entire ad could be generated without ever accessing an external database.

Again, to generate the XML file, an XSLT file is used to translate or transform the XFDF native format. A Javascript "plug-in" can be used to interact with the Adobe Acrobat, for example, via Acrobat's available application program interface (API) to access the native XFDF. The XSLT ensures that the XML that is formed is compliant to the pre-specified DTD, whereby the XML will be valid and well-formed, meaning that, for example, beginning and ending tags are accurately provided.

Thus, as can be readily appreciated by those skilled in the art, the present invention provides advantageous systems and methods that help to facilitate the generation of extensible content generally, and in at least one specific example, the publication of directories, such as dining guides.

As can also be readily appreciated in view of the foregoing, the present invention provides the ability to use any arbitrary structure (e.g., a DTD, etc.) to plug directly into the form data entry application of the present invention to obtain validated data entry. One exemplary use of an arbitrary structure might be to employ a predefined DTD for ordering lunch. The "ordering lunch DTD" could be plugged into a ubiquitous or otherwise readily available software package such as Adobe Acrobat, whereby a user could easily generate W3C compliant XML based on the specified DTD. Of course, some program code would be needed to create the form fields consistent with the structure in the arbitrary DTD.

There is also great potential to use various software clients on different devices to allow the use of XSL files to automatically create input screens on the devices. This would mean both a structure file (e.g. DTD, XML schema, etc.) and a screen controlling XSL file could be plugged into the client application to automatically control the look and feel of the user interface for that device. For example, employing the same lunch ordering scenario, one could extend the ordering functionality to a wireless device by sending an XSL file corresponding to the handheld device's characteristics, along with a DTD file to a person wishing to create content on that device. Accordingly, the steps required to create a data entry screen would be unnecessary, because the XSL file for that device would automatically create the data entry screen based on the XML structure in the DTD.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of creating extensible and repurposable content, comprising the steps of:
   (a) creating a document type definition (DTD) resident in a second workstation;
   (b) on a first workstation executing a data form application and inputting data which is subsequently stored in a database;
   (c) on the second workstation in communication with the database, generating a form-based data entry interface based on the DTD, wherein the form-based data entry interface is implemented as a portable document format accessible via a portable document format compatible application program that is incapable of saving data in the form of extensible markup language (XML);
   (d) inputting data into the form-based data entry interface that is accessible via the application program from the database;
   (e) applying an extensible stylesheet language (XSL) construct to the data that is input at step (d) by accessing the form-based data entry interface via a script based plug-in to the application program;
   (f) through application of the XSL, saving the data into the database in the form of XML consistent with the DTD to produce a first XML file while contemporaneously saving the data to the database in the form in the portable document format to produce a first portable document format file;
   (g) after saving the data and closing the form-based data entry interface, accessing the form-based data entry interface and data in the portable document format via the portable document format compatible application program;
   (h) editing the data through the form-based data entry interface via the application program;
   (i) re-applying the XSL construct to the edited data by again accessing the form-based data entry interface via the script based plug-in to the application program; and
   (j) through application of the XSL, saving the edited data in the form of XML consistent with the DTD to replace the first XML file while contemporaneously saving the edited data in the form in the portable document format to replace the first portable document format file.

2. The method of claim 1, wherein the DTD defines an aspect of a business.

3. The method of claim 1, wherein the content is represented by the DTD.

4. The method of claim 1, wherein the data saved at step (e) is saved in World Wide Web Consortium (W3C) compliant XML format.

5. The method of claim 4, wherein the data saved at step (f) is employed to generate a graphics product.

6. The method of claim 4, wherein the data saved at step (f) is employed to generate a text-to-voice information.

7. The method of claim 4, wherein the data saved at step (f) is employed as content for a wireless message.

8. The method of claim 1, further comprising employing the data saved at step (e) for purpose other than producing a first portable document format file.

9. A method of preparing an entry in a directory having a plurality of separately prepared entries, the method comprising the steps of:
   (a) on a computer, accessing an extensible markup language (XML) file in a database in communication with the computer that is representative of the entry to be included in the directory, the XML file being based on a document type definition (DTD) consistent with the directory;
   (b) launching a first software program, the first software program presenting a form that is displayed on a graphical user interface executing on the computer, wherein the first software program has a native file saving format that is different from a format of the XML file and wherein the first software program is incapable of opening and saving data that is in the format of the XML file;
   (c) populating selected fields in the form displayed on the graphical user interface by transforming the XML file using (i) an extensible stylesheet transformation (XSLT) file and (ii) application programming interface (API) exposed by the first software program where a script-based plug-in provides information of the XML filed that is transformed by the XSLT to the first software program for inclusion in a first portable document format file;
   (d) at least one of modifying the selected fields and adding data to fields other than the selected fields;
   (e) spawning a graphics page using the first software program and displaying the entry;
   (f) saving the entry as an XML file to the database by using the XSLT file and the API wherein the script-based plug-in provides information of the first portable document format file from the first software program to the XSLT, and contemporaneously saving the first portable document format file;

(g) after closing the first portable document format file, then accessing the first portable document format file to edit the graphics page within the first software program;

(h) re-applying the XSLT to the edited graphics page by again accessing the information via the script based plug-in to the first software program; and (i) through application of the XSL, saving the edited graphics page to replace the XML file while contemporaneously saving the edited graphics page in the portable document format to replace the first portable document format file;

(j) Compiling the graphics page with a plurality of graphics pages to publish the directory.

10. The method of claim 9, further comprising editing components of the entry using a second software program.

11. The method of claim 9, further comprising saving the entry as an encapsulated postscript (EPS) file.

12. The method of claim 9, wherein the directory comprises a dining guide.

13. The method of claim 12, wherein the entry comprises an advertisement in the dining guide.

14. The method of claim 9, further comprising selecting an entry style wherein the entry style is described by a universal directory advertising code (UDAC).

15. The method of claim 9, further comprising accessing the XML file via a copy ID.

16. A method of publishing, comprising the steps of:
(a) from a workstation saving first information associated with a graphics design to a first database in communication with a second database as a first portable document format file;
(b) assigning a copy ID to the first portable document format file including the first information;
(c) transferring the first portable document format file including the first information from the first database to the second database which is in communication with a computer;
(d) accessing the first portable document format file including the first information by the computer via the second database and via the copy ID and populating selected fields of a form that is implemented as a portable document format and displayed on the computer implementing a first portable document format compatible computer application that is incapable of saving the information as an extensible markup language (XML) file;
(e) at least one of (i) modifying the first information and (ii) adding second information to fields other than the selected fields via the form being implemented as a portable document format;
(f) spawning a graphics page on the computer that incorporates the first and second information in a preselected style for the graphics design, wherein the graphics page is further implemented via the first portable document format compatible computer application that is incapable of saving the information as an XML file;
(g) editing graphics components of the graphics design resulting in an edited graphics design;
(h) saving the edited graphics design as an XML file by applying an extensible stylesheet language transformation (XSLT) file to the first and second information by accessing the first portable document format compatible computer application via a script-based plug-in;
(i) after saving the edited graphics design and closing the form, accessing the form and edited graphics design in the portable document format via the portable document format compatible application program;
(j) editing the edited graphics design through the form-based data entry interface via the application program;
(k) re-applying the XSL construct to the edited graphics design by again accessing the application program via the script based plug-in; and
(l) through application of the XSL, saving the edited graphics design in the form of XML to replace the XML file while contemporaneously saving the edited graphics design in the form in the portable document format to replace the first portable document format file;
(m) compiling the graphics design with a plurality of other graphics designs;
(n) publishing the plurality of graphics designs.

17. The method of claim 16, wherein the graphics design is an advertisement.

18. The method of claim 16, wherein the first information comprises at least one of a name of a restaurant, a restaurant address, and an advertisement style.

19. The method of claim 18, wherein the advertisement style is described as a universal directory advertising code (UDAC).

20. The method of claim 16, wherein the first database is accessible primarily by salespeople.

21. The method of claim 16, wherein the second database is accessible primarily by a graphics artist.

22. The method of claim 16, wherein the step of saving comprises transforming a first file format that the first and second information is saved within into XML using a predetermined XSLT file.

23. The method of claim 22, wherein the first file format is XFDF.

24. The method of claim 16, further comprising saving the edited graphics design as an encapsulated postscript (EPS) file.

25. The method of claim 24, further comprising forwarding the EPS file to a printer.

26. A system for generating an entry for a directory that comprises a plurality of entries, the system comprising:
(a) a first workstation operable to receive first information related to the entry;
(b) a first database for storing the first information;
(c) a second database that periodically receives the first information from the first database; and
(d) a second workstation, the second workstation being operable to access the second database,
wherein the second workstation is operable to (i) launch a first software program, the first software program presenting a form that is displayed on the second workstation, wherein the first software program has a native file saving format that is different from a format of an XML file and wherein the first software program is incapable of saving a file in the format on an XML file, (ii) at least one of modify selected fields in the form and add data to fields other than the selected fields, (iii) spawn a graphics page using the first software program to display the entry, and (iv) save the entry as an XML file by applying an extensible stylesheet language transformation (XSLT) file to the data of the entry, wherein the XSLT is applied by accessing the first software program via a script-based plug-in, wherein the first software program saves the graphics page as a portable document format file contemporaneously with the XSLT creating an XML file, wherein the saved graphics page is re-opened by the first software program accessing the portable document format file to edit the graphics page, wherein the XSLT is re-applied to the edited graphics page to replace the XML file with a new XML file while the first software program contemporaneously saves the edited graphics page to replace the portable document format file with a new portable document format file.

27. The system of claim 26, wherein the second workstation is further operable to save the entry as an encapsulated postscript (EPS) file.

28. The system of claim 26, wherein the directory is a dining guide.

29. The system of claim 28, wherein the entry comprises an advertisement in the dining guide.

30. The system of claim 26, wherein the first database is accessible primarily by a salesperson.

31. The system of claim 26, wherein the second database is accessible primarily by a graphics artist.

* * * * *